United States Patent
Ohki et al.

(10) Patent No.: US 8,463,112 B2
(45) Date of Patent: Jun. 11, 2013

(54) PLAYBACK METHOD AND PLAYBACK APPARATUS

(75) Inventors: Takashi Ohki, Kawasaki (JP); Kenji Inoue, Hiratsuka (JP); Kensaku Misumada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 12/652,246

(22) Filed: Jan. 5, 2010

(65) Prior Publication Data

US 2010/0172627 A1  Jul. 8, 2010

(30) Foreign Application Priority Data

Jan. 6, 2009  (JP) .................... 2009-000971

(51) Int. Cl.
 *H04N 5/783*  (2006.01)
(52) U.S. Cl.
 USPC ........................... 386/343; 386/350
(58) Field of Classification Search
 None
 See application file for complete search history.

(56) References Cited

U.S. PATENT DOCUMENTS

| 7,149,411 | B2 | 12/2006 | Jun et al. |
| 2007/0140648 | A1* | 6/2007 | Takahashi ............... 386/68 |
| 2008/0107402 | A1* | 5/2008 | Angiolillo et al. .......... 386/124 |
| 2011/0064379 | A1* | 3/2011 | Hayashi ............... 386/239 |

FOREIGN PATENT DOCUMENTS

| JP | 2001-320677 A | 11/2001 |
| JP | 2004-363808 A | 12/2004 |
| JP | 2005-293680 A | 10/2005 |
| JP | 2005-348378 A | 12/2005 |
| JP | 2007-066407 A | 3/2007 |

OTHER PUBLICATIONS

Japanese Office Action issued in corresponding application No. 2009-000971 dated Mar. 5, 2013.

* cited by examiner

*Primary Examiner* — William C Vaughn, Jr.
*Assistant Examiner* — Asher Khan
(74) *Attorney, Agent, or Firm* — Carter, DeLuca, Farrell & Schmidt LLP (57) ABSTRACT

When a skip operation is carried out and then another skip operation is carried out next, it is determined whether or not a direction of a first skip operation and a direction of a skip operation carried out next are opposite directions. If the direction of the skip operation carried out next is the opposite to the direction up to that point in time and there is a change point between scenes in a skip segment of the skip operation carried out next, skip processing is carried out such that the playback position is placed to the change point of this scene. Thereby, for example, when the content is played back after jumping past a CM, the boundary between the CM and program can be easily found, and the replay can be started.

20 Claims, 6 Drawing Sheets

PLAYBACK METHOD AND PLAYBACK APPARATUS

BACKGROUND OF THE INVENTION

1. Field of the Invention

The present invention relates to a content playback method and a content playback apparatus, and in particular, relates to an improvement of the skip processing that moves the playback position by a prescribed time interval.

2. Description of the Related Art

Video recorder and video player have fast forward and fast reverse functions as trick-play functions for playing back content with jumping unnecessary portions of the contents. Furthermore, there are also a "forward skip" function that moves the playback position in the playback direction by a prescribed time interval, and a "reverse skip" function that moves the playback position in a direction opposite to that of the playback direction by a prescribed time interval.

The skip functions are used when, for example, the user wishes to play back content with jumping a commercial message (CM) portion. Specifically, in the case in which the user plays back content after jumping past a CM portion, the user operates a skip button and advances the playback position of the content by a prescribed time interval when a playback position reaches a portion for a CM. Here, if this CM portion is followed by another CM portion, the user operates the skip button and again repeats the operation in which the playback position of the content advances by a prescribed time interval. In addition, when the boundary between the end of the CM and the start position of a program has been passed, the user carries out a skip operation in the opposite direction. By repeating such an operation, the portion having the CM is jumped past to reach the playback position of a program.

In addition, a function is also provided that detects any scene change points in the content being played back, and places the playback position to a detected scene change point. Additionally, various types of arrangement that combine the fast forward and rewind functions, the skip functions, and the scene change point detection function have been proposed.

Japanese Patent Laid-Open No. 2007-066407 discloses that when the user carries out a skip operation, in the case in which a recording and playback apparatus detects that a scene change point is present during a fixed time interval, the playback is carried out from the nearest change point.

In addition, Japanese Patent Laid-Open No. 2005-293680 discloses that when playback is carried out, after a user has performed a fast forward operation, playback is carried out after the playback start position has been moved from the playback start position to the closest scene change point.

However, because the movement interval of the playback position during a skip operation is fixed, when detecting a desired playback position by using the forward skip operation or the reverse skip operation, frequently the user passes ahead of the desired playback position or returns past the desired playback position. Thus, as described above, when content is replayed after jumping past a CM, the replay position of the boundary between the end of the CM and the starting position of the program cannot be easily reached.

In addition, in Japanese Patent Laid-Open No. 2007-066407, the desired playback position can be reached by automatically moving to a scene change point when a skip operation is carried out. However, there are cases in which the playback position is moved to a position that differs from the position intended by the user.

For example, in the case in which the skip interval is 30 seconds, normally it is sufficient for the user to carry out the skip operation four times in order to skip two minutes ahead. However, in the invention disclosed in Japanese Patent Laid-Open No. 2007-066407, even if a position two minutes ahead is reached, when there is a scene change point before this, the playback position will skip to the position of this scene change point. Thus, the necessary number of operations for moving to the desired playback position increases. In addition, in the invention that is disclosed in Japanese Patent Laid-Open No. 2007-066407, when there is a scene change point, the skip interval is not fixed. Because skip is a function that moves the playback position by a fixed time interval, when the movement interval of the playback position due to a skip operation is not fixed, the playback position becomes difficult for the user to recognize.

SUMMARY OF THE INVENTION

According to an aspect of the present invention, a playback method includes determining whether or not, after a first skip operation has been carried out, a second skip operation is carried out sequentially, determining whether or not a direction of the first skip operation and a direction of the second skip operation are opposite if it has been determined that the second skip operation has been carried out after the first skip operation was carried out, determining whether or not, if the direction of the first skip operation and the direction of the second skip operation have been determined to be opposite, there is a scene change point in a skip segment of the second skip operation, and placing a playback position to the scene change point if the direction of the first skip operation and the direction of the second skip operation are opposite and there is the scene change point in the skip segment of the second skip operation.

Further features of the present invention will become apparent from the following description of exemplary embodiments with reference to the attached drawings.

DESCRIPTION OF THE EMBODIMENTS

Figure 1:
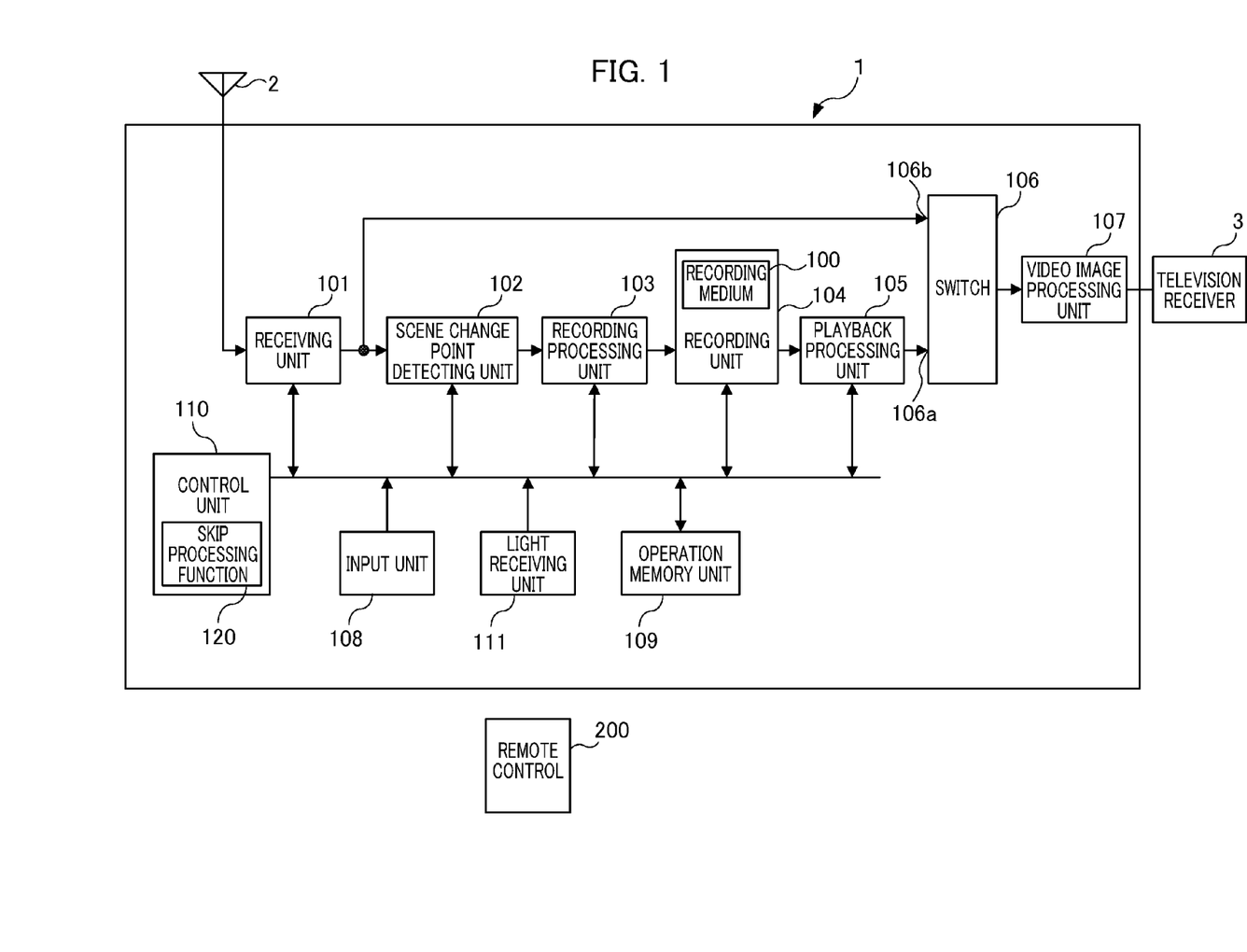
FIG. 1 is a block diagram that shows the structure of a first embodiment of the present invention.

Below, embodiments of the present invention will be explained with reference to the figures.
First Embodiment FIG. 1 is a block diagram that shows the structure of a hard disk recorder 1, which is a first embodiment of the present invention. As shown in FIG. 1, the hard disk recorder 1 of the first embodiment of the present invention is formed by a receiving unit 101, a scene change point detecting unit 102, a recording processing unit 103, and a recording unit 104. In addition, the hard disk recorder 1 is also formed by a playback processing unit 105, a switch 106, a video image processing unit 107, an input unit 108, an operation memory unit 109, a control unit 110, and a light-receiving unit 111.

From the broadcast waves received by the antenna 2, the receiving unit 101 selects and demodulates the broadcast waves of the channel that has been specified by the control unit 110, and acquires the content and sends it to the scene change point detecting unit 102. The scene change point detecting unit 102 detects the position at which the scene in the content data changes and sends the position information for the scene change point, along with the content data, to the recording processing unit 103. As one example, because previous and next video images change significantly at the location where the scene changes, the differences between video image data in continuous screens is calculated, and then the scene change point can be detected by using locations where the differences in the video image data of these continuous screens is large.

The recording processing unit 103 converts the content data that has been sent and the information for the scene change point to a data format for recording by the recording unit 104, carries out encryption processing, and sends the result to the recording unit 104. The recording unit 104 is formed by a recording medium 100 such as a hard disk drive or the like, and the encoded content data and the position information for the scene change point that have been sent by the recording processing unit 103 are recorded on the recording medium 100. The playback processing unit 105 carries out the conversion and decryption of the content data into a form that can be processed by the video image processing unit 107 when the content that has been recorded on the recording medium 100 of the recording unit 104 is played back. In addition, by the switch 106, the playback processing unit 105 outputs this data to the outside as video and audio signals that can be displayed by a television receiver 3 or a monitor.

The switch 106 switches between the playback content from the recording unit 104 and the content that has been received by the receiving unit 101. When the recorded content is replayed and watched, the switch 106 is switched to the input terminal 106a side, and the content data from the playback processing unit 105 is sent to the video image processing unit 107. When watching a program that is being received, the switch 106 is switched to the input terminal 106b side, and the content data from the receiving unit 101 is sent to the video image processing unit 107.

The video image processing unit 107 converts the content data that is sent through the switch 106 to a video image signal and an audio signal, and these signals are output to the television receiver 3. The input unit 108 receives the user operations from the buttons of the recording and playback apparatus body, and sends these commands to the control unit 110.

Examples of such user operations include the setting of the time and channel for a program during a recording operation in the recording and playback apparatus, and operations such as the fast forward, rewind, skip, and stop during the playback operation.

The operation memory unit 109 stores the operation information for the fast forward, rewind, and skip that the user has carried out. Here, operation information is information for the operating direction indicating whether the playback position of the content is advancing in the forward direction or returning in the reverse direction due to an operation. Because the necessary volume of this operation information is also small and there is no need to store it long term, the operation storage unit 109 can be formed by RAM (Random Access Memory) and the like.

The control unit 110 carries out the control of each constituent element after receiving commands from the input unit 108 and the remote control 200, carries out the control of the time and channel whose content is to be recorded during recording, and controls the playback position for fast forward, rewind, and skip during replay. In addition, when receiving commands for a skip operation or fast forward and rewind operations, the control unit 110 stores the information for the operation direction of the skip operation or the fast forward and rewind operations in the operation memory unit 109. When the control unit 110 receives a command for a skip operation next, it determines whether the operation direction stored in the operation memory unit 109 and the direction of the skip operation received next are the same direction or the opposite direction. When this direction is the opposite direction, the control unit 100 refers to the position information for the scene change point that has been recorded by the recording unit 104, and if there is a the scene change point within the skip segment of the skip operation received next, the skip processing function 120 is realized such that the playback position is moved to the scene change point from the end of skip segment. This processing will be explained below.

The light-receiving unit 111 receives user operations by receiving infrared signals from the remote control 200, and sends these commands to the control unit 110. Examples of user operations include operations for setting the time and channel of a program in the recording and playback apparatus during a recording operation, and operations such as fast forward, rewind, skip, and stop during a playback operation.

Figure 2:
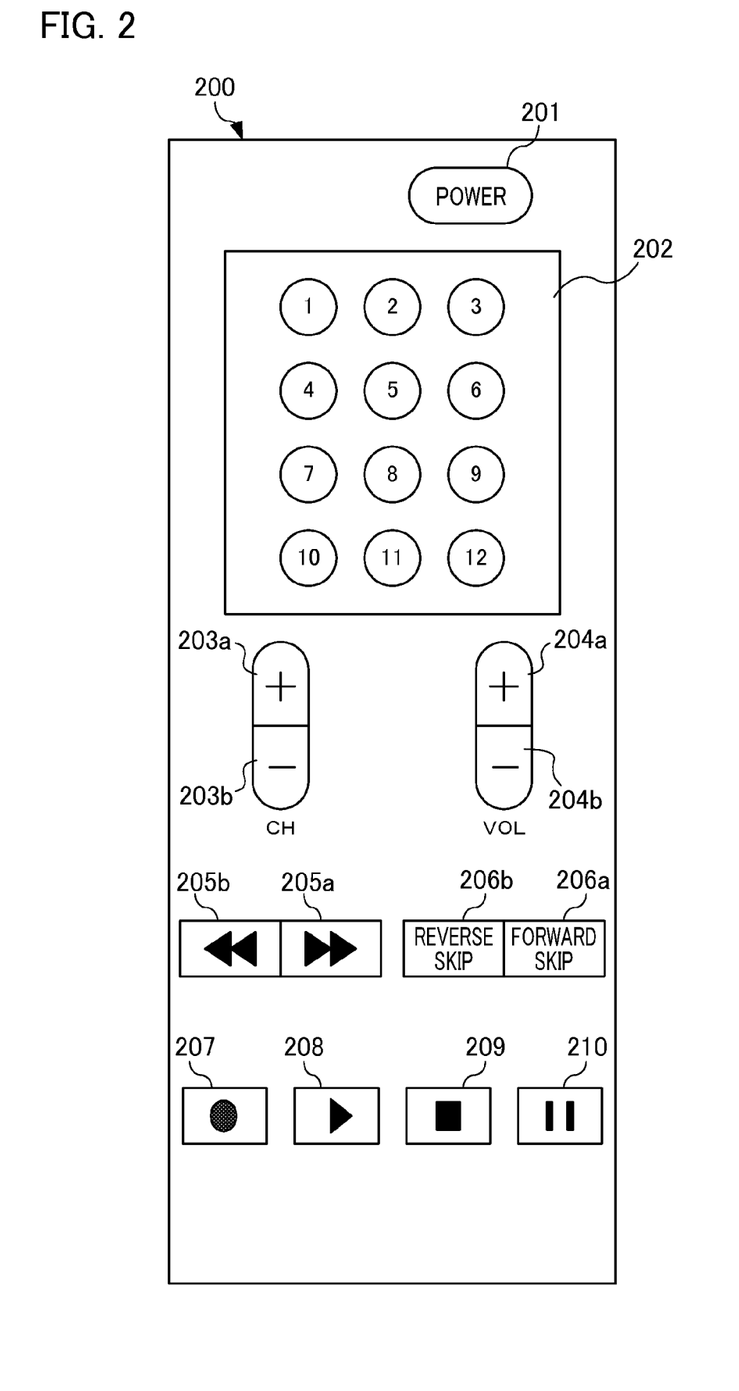
FIG. 2 is an explanatory drawing of the configuration of the external appearance of the remote control in the first embodiment of the present invention.

FIG. 2 shows the external appearance of the layout of the remote control 200. As shown in FIG. 2, the remote control 200 is provided with a power button 201, a channel button 202, channel change buttons 203a and 203b, and volume buttons 204a and 204b. The remote control 200 is further provided with fast forward and rewind buttons 205a and 205b, forward and reverse skip buttons 206a and 206b, a recording button 207, a playback button 208, a stop button 209, and a pause button 210.

The power button 201 is a button that switches the power ON and OFF. The channel button 202 and the channel change buttons 203a and 203b are for selecting the channel to be viewed. The volume buttons 204a and 204b carry out the adjustment of the sound volume. The fast forward and rewind buttons 205a and 205b are buttons that replay the content at high speed in the forward direction and the reverse direction. The forward and reverse skip buttons 206a and 206b are buttons that move the playback position by a prescribed time interval in the forward direction and the reverse direction. The record button 207 carries out the recording of content. The playback button 208 carries out the normal playback of the content. The stop button 209 stops the playback. The pause button 210 temporarily stops the playback.

As shown in FIG. 2, the fast forward and rewind buttons 205a and 205b and the forward and reverse skip buttons 206a and 206b are present on the remote control 200. The user can thereby detect the desired playback position and carry out the playback.

Figure 3:
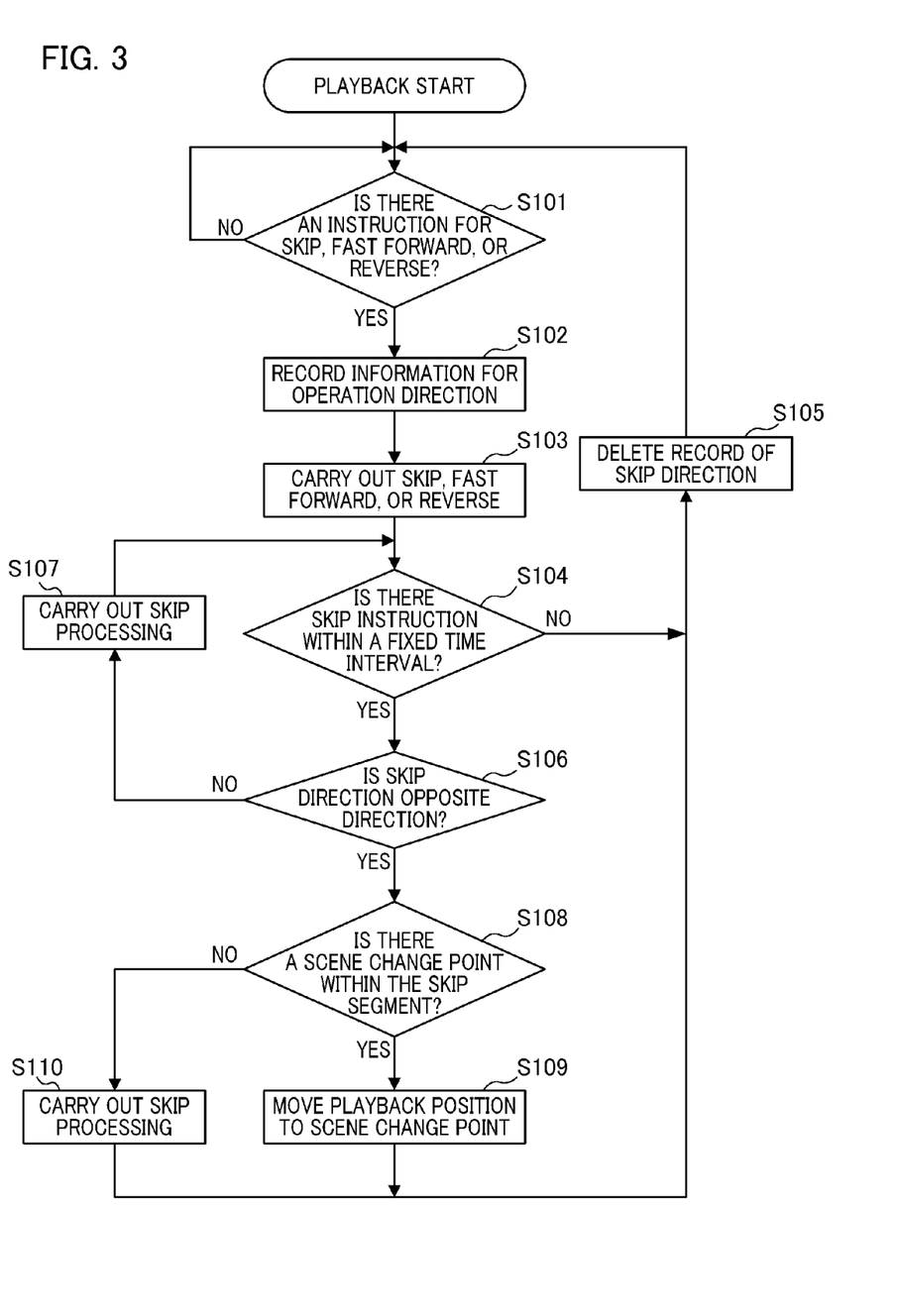
FIG. 3 is a flowchart used in the explanation of the skip operation in the first embodiment of the present invention.

Next, the skip processing of the first embodiment of the present invention will be explained. FIG. 3 is a flowchart of the control related to the skip process function 120 that is carried out by the control unit 110. In FIG. 3, the control unit 110 advances the processing to step S101 when the playback of recorded content has started. Note that the position information for a scene change point in the content to be played back is recorded along with the content on the recording medium 100 of the recording unit 104 during recording by the scene change point detecting unit 102.

In step S101, the control unit 110 determines whether an instruction for the skip, fast forward, or rewind operation has been carried out. Then, the control unit 110 advances the processing to step S102 in the case in which any of these operations has been carried out (YES in step S101). In step S102, the control unit 110 stores the operation direction due to the operation that was carried out in step S101 in the operation memory unit 109. There are two of these operation directions: the "forward direction" and the "reverse direction". Then, in step S103, the control unit 110 carries out the skip, fast forward, or rewind processing, and advances the processing to step S104.

In step S104, the control unit 110 determines whether or not the next skip operation has been carried out within a fixed time interval (for example, within 3 seconds) after the operation in step S101 has been carried out. Note that in the case in which the operation that has been carried out in step S101 is a fast forward or reverse operation, the fixed time interval described above is the time that has passed since the playback operation was carried out after these operations. In step S104, in the case in which it has been determined that the skip operation has been carried out within the fixed time interval (Yes in step S104), the control unit 110 advances the processing to step S106.

In contrast, in the case in which the skip operation has not been carried out within the fixed time interval (No in step S104), in step S105, the operating unit 110 deletes the information for the operation direction that has been stored in the operation memory unit 109, and returns the processing to step S101. In Step S106, the control unit 110 compares the operation direction of the skip operation or the fast forward and rewind operations in step S101 and the operation direction of the skip operation in step S104 that was carried out next, and determines whether or not the direction of the skip operation was opposite to the operation direction up to that point in time. Here, the operation direction in step S101 uses the information for the operation direction that has been stored in the operation memory unit 109 in step S102.

When the operation direction of the skip operation or the fast forward and rewind operations in step S101 and the operation direction of the skip operation in step S104 that was carried out next are the same direction, the user has repeated the operation in the same direction. Therefore, the operating unit 110 infers a state in which the user has not yet been able to reach the target playback position. Therefore, in step S106, in the case in which the operation direction of the skip operation or the fast forward and rewind operations in step S101 and the operation direction of the skip operation in step S104 are the same direction, the control unit 110 carries out skip processing in step S107, and then returns the processing to step S104.

In contrast, when the operation direction of the skip operation or the fast forward and rewind operations in step S101 and the operation direction of the skip operation S104 carried out next are opposite directions, the control unit 110 infers a state in which the user has fast forwarded or rewound past the target playback start position. Thus, in this case, the control unit 110 can infer that there is a target playback start position within the segment to which the position has been moved from the position specified in step S104 due to the skip processing. Thus, in step S106, in the case in which the control unit 110 has determined that the operation direction of the skip operation or the fast forward and rewind operations in step S101 and the operation position of the skip operation in step S104 are opposite directions (Yes in step S106), the processing proceeds to step S108. The control unit 110 refers to the recording portion 104 in step S108, and determines whether or not there is a scene change point within the segment of the skip that has been designated in step S104.

In step S108, in the case in which a scene change point is present (Yes in step S108), the control unit 110 moves the playback position from the current playback position to the closest scene change point from a skip end position among the scene change points within the skip segment in step S109. Note that among the scene change points within the skip segment, the control unit 110 may place the playback position (the movement destination position) to the scene change point that is farthest from the current playback position.

In contrast, in the case in which no scene change point is present (No in step S108), the control unit 110 carries out skip processing in step S110. After carrying out the processing in step S109 and step S110, the control unit 110 deletes the information for the operation direction that was stored by the operation storing unit 109 in step S105, returns to step S101, and repeats this processing until the playback has completed.

Figure 4A:
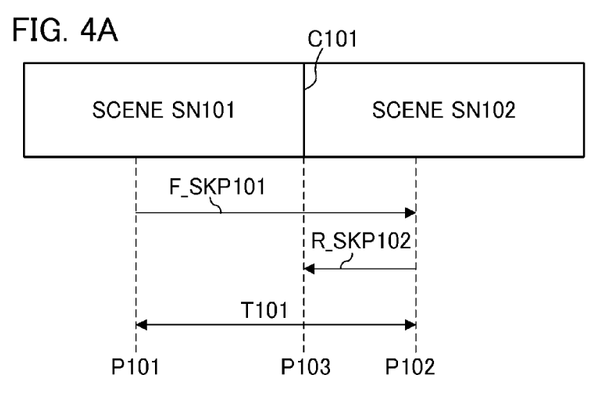
FIG. 4A is an explanatory drawing of the case in which, in the first embodiment of the present invention, a reverse skip operation is carried out after a forward skip operation.

Next, the operation of the skip operation in a first embodiment of the present invention will be concretely explained. FIG. 4A shows the operation in the case in which there was a scene change point in the skip segment when carrying out a reverse skip operation immediately after a forward skip operation.

In FIG. 4A, there is a scene change point C101 at the boundary between scene SN101 and scene SN102. Here, it is assumed that from position P101 of scene SN101 up to position P102 of scene SN102, which spans over the scene change point C101, the forward skip operation F_SKP101 is carried out, and from position P102 of scene SN102, the reverse skip operation R_SKP102 is carried out. In this case, conventionally, skipping would be carried out from position P102 to position P101, returning by skip segment T101. However, the direction of the skip operation R_SKP102 carried out next is the direction opposite to that of the skip operation F_SKP101 up to that point in time, and there is a scene change point C101 in the skip segment T101 due to the skip operation R_SKP102 carried out next. In this case, the playback position P103 skips to the position C101 of the scene change point.

Specifically, in this case, the forward skip operation F_SKP101 being carried out by the first forward skip operation is stored in the operation memory unit 109 (step S102). Subsequently, when the reverse skip operation R_SKP102 is carried out again, it is determined whether or not the skip operation is in the same direction as that of the operation direction stored by the operation memory unit 109 (step S106).

Because the orientation that has been stored in the operation memory unit 109 is the operation F_SKP101 in the forward direction and the operation carried out next is the operation R_SKP102 in the reverse direction, the skip operation is in the direction opposite to that of the previous operation. Thus, the processing proceeds to step S108, and referring to the recording unit 104, it is determined whether or not there is a scene change point in the skipped segment T101 from the point P102 to the point P101, which is the destination during the reverse skip operation. Because the scene change point C101 is present from the point P102 to the segment T101, in the processing of step S109, the playback position P103 is moved to the scene change point C101.

Note that in the case in which there is no scene change point within the segment T101, the reverse skip operation is carried out and the position is placed to position P101 (step S110). In this manner, when the user has carried out a reverse skip operation after passing the target replay position by using a forward skip operation, it is possible to place the playback position to a scene change point. In this manner, the present invention does not determine whether there is a scene change point in a skip segment for every skip operation. In the case in which a reverse skip operation is carried out following a forward skip operation, it is determined whether or not there is a scene change point in a reverse skip segment. Thus, the processing for determining whether there is a scene change point is reduced.

Figure 4B:
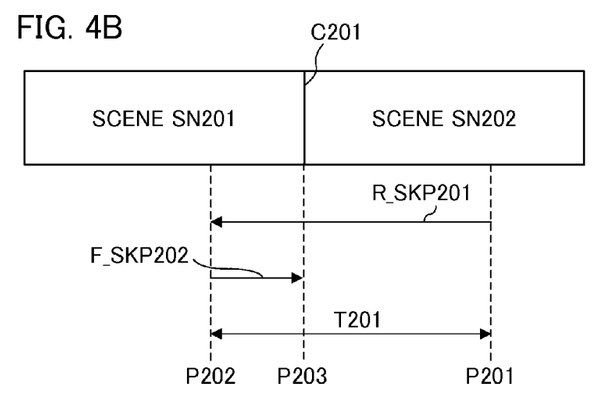
FIG. 4B is an explanatory drawing of the processing of the case in which, in the first embodiment of the present invention, a forward skip operation is carried out after a reverse skip operation.

FIG. 4B shows the operation for the case in which there is a scene change point within a skip segment when a forward skip operation has been carried out immediately after a reverse skip operation. In FIG. 4B, there is a scene change point C201 at the boundary between scene SN201 and scene SN202. In this example, a reverse skip operation R_SKP 201 is carried out from the position P201 in scene SN202 to the position P202 in scene SN201, which spans over the scene change point C201, and the forward skip operation F_SKP202 is carried out from the position P202 of scene SN201. In this case, conventionally, the position skips from position P202 to position P201, advancing only by skip segment T201. However, the direction of the skip operation F_SKP202 carried out next is the direction opposite to that of the skip operation R_SKP201 up to that point in time, and there is a scene change point S201 within the skip segment T201 due to the skip operation F_SKP202 carried out next. In this case, the playback position P203 skips to the position C201 of the scene change point.

Specifically, in this case, first, the reverse skip operation R_SKP201 being carried out by a reverse skip operation is stored in the operation memory unit 109 (step S102). Subsequently, when the forward skip operation is carried out again, it is determined whether or not this skip operation is in the same direction as the operation direction that has been stored in the operation memory unit 109 (step S106).

Because the orientation stored in the operation memory unit 109 is the reverse direction operation R_SKP201 and the operation carried out subsequently is the forward direction operation F_SKP202, this skip operation is in the direction opposite to that of the previous operation. Thus, the processing proceeds to step S108, and referring to the recording unit 104, it is determined whether or not there is a scene change point in the skip segment T201 from position P202 to position P201, which is the playback position during the forward skip operation. Because a scene change point C201 is present from position P202 in the segment of segment T201 from point 202, the playback position P203 is moved to the scene change point C201 in the processing of step S109.

In the case in which there is no scene change point in the segment T201, a forward skip operation is carried out, and the position is moved to position P201 (step S110). In this manner, when the user has passed the target playback position due to a reverse skip operation and then a forward skip operation was carried out, it is possible to place the playback position to the scene change point.

Figure 4C:
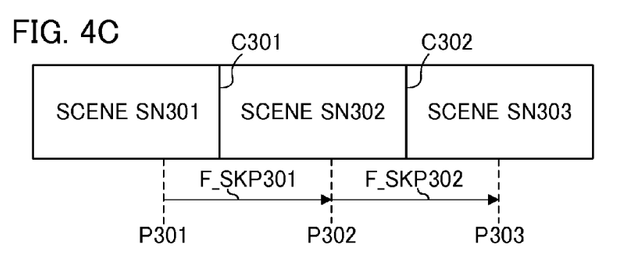
FIG. 4C is an explanatory drawing of the processing of the case in which, in the first embodiment of the present invention, a forward skip operation is carried out after a forward skip operation.

FIG. 4C shows the action when first a forward skip operation is carried out and then immediately followed by a forward skip operation. In FIG. 4C, there is a scene change point C301 at the boundary between scene SN301 and scene SN302, and there is a scene change point C302 at the boundary between scene SN302 and scene SN303. Here, it is assumed that a forward skip operation F_SKP301 is carried out from position P301 of scene SN301 to position P302 of scene SN302 spanning over the scene change point C301, and a forward skip operation F_SKP302 is carried out from position P302 of scene SN301. In this case, because the direction of the skip operation F_SKP302 carried out next is the same as that of the skip operation F_SKP301 up to that point in time, the position skips to position P303 of scene SN303.

Specifically, in this case, the operation unit 110 carries out a forward skip operation F_SKP301 by a first forward skip operation, and the operation in the forward direction being carried out is stored by the operation memory unit 109 (step S102). Subsequently, when a forward skip operation F_SKP302 is carried out again, it is confirmed whether or not this is the same direction as the operation direction that has been stored in the operation memory unit 109 (step S106). In this case, because both are operations in the forward direction and thus the same, the processing advances to step S107, and forward skip processing is carried out.

Figure 4D:
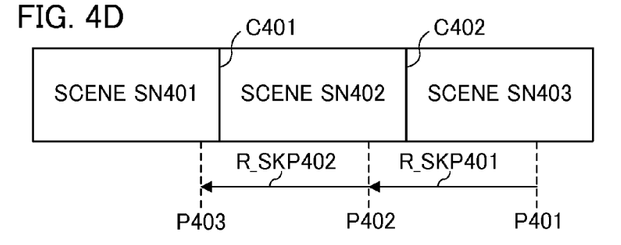
FIG. 4D is an explanatory drawing of the processing of the case in which, in the first embodiment of the present invention, a reverse skip operation is carried out after a reverse skip operation.

FIG. 4D shows the action when a reverse skip operation is carried out immediately after a reverse skip operation. In FIG. 4D, there is a scene change point C401 at the boundary between scene SN401 and scene SN402, and there is a scene change point C402 at the boundary between scene SN402 and scene SN403. Here, it is assumed that a reverse skip operation R_SKP401 is carried out from position P401 of scene SN403 to position P402 of scene SN402, which spans over scene change point C402, and that a reverse skip operation R_SKP402 is carried out from position P402 of scene SN401. In this case, because the direction of the skip operation R_SKP402 carried out next is the same as that of the skip operation R_SKP 401 up to that point in time, the operation unit 110 skips to position P403 of scene SN403.

Specifically, in this case, the operation unit 110 carries out a reverse skip operation R_SKP401 by the first forward skip operation, and an operation in the forward direction being carried out is stored by the operation memory unit 109 (step S102). Subsequently, when the forward skip operation R_SKP402 is carried out, the control unit 110 confirms whether or not this is the same direction as the operation direction that has been stored in the operation memory unit 109 (step S106). In this case, because both are operations in the reverse direction, the operation unit 110 advances to the processing of step S107 and the reverse skip operation is carried out.

In this manner, when the following skip operation has been carried out in the same direction, the next skip is carried out without moving to the scene change point, and thus, the skip processing is carried out without moving to an intermediate scene change point.

Figure 4E:
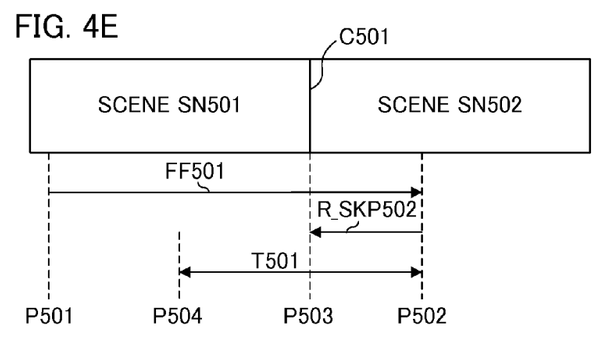
FIG. 4E is an explanatory drawing of the processing of the case in which, in the first embodiment of the present invention, a reverse skip operation is carried out after a fast forward operation.

FIG. 4E shows the action in the case in which, immediately after completing fast forward, there is a scene change point in the skip segment in which a reverse skip operation has been carried out. In FIG. 4E, there is a scene change point C501 at the boundary between scene SN501 and scene SN502. Here, a fast forward operation FF501 is carried out from the point P501 in scene SN501 to point P502 in scene SN502, spanning over the scene change point C501. In this case, conventionally, skipping is carried out from the point P502 to point P504, returning by the skip segment T501. However, the direction of the skip operation R_SKP502 carried out next is opposite to the direction of the fast forward operation FF501 up to that point in time, and there is a scene change point C501 in the skip segment T501 due to the skip operation R_SKP502 that is carried out next. Therefore, the playback position P503 skips to the position C501 of the scene change point.

Specifically, when the user carries out a fast forward operation, the fast forward operation FF501 being carried out in the forward direction is stored in the operation memory unit 109 (step S102), and the fast forward continues until stopped by the user. Next, when a reverse skip operation R_SKP502 is carried out after the fast forward operation FF501 has been stopped, it is determined to be a reverse skip that is in the direction opposite to that which has been stored in the operation memory unit 109 (step S106). In addition, referring to the recording unit 104, it is determined whether or not there is a scene change point in the skip segment T501 of the reverse skip (step S108). Because a scene change point C501 is present in the segment T501, the processing proceeds to step S110, and the playback position is moved to C501.

As explained above, in the first embodiment of the present invention, after a skip operation (first skip operation) or fast forward and rewind operations have been carried out, a skip operation (second skip operation) is carried out next. Then the following actions are carried out. It is determined whether or not the direction of the first skip operation (first skip operation) or the fast forward and rewind operations and the direction of the skip operation (the second skip operation) carried out next are in opposite directions. If the direction of the skip operation (second skip operation) carried out next is opposite to the direction up to this point in time and there is a change point between scenes in the skip segment of the skip operation (second skip operation) carried out next, the playback position is moved to this scene change point. Thereby, for example, when a CM is jumped past and the content is played back, the boundary between a CM and a program can be easily found, and playback can be started.

Second Embodiment

Figure 5:
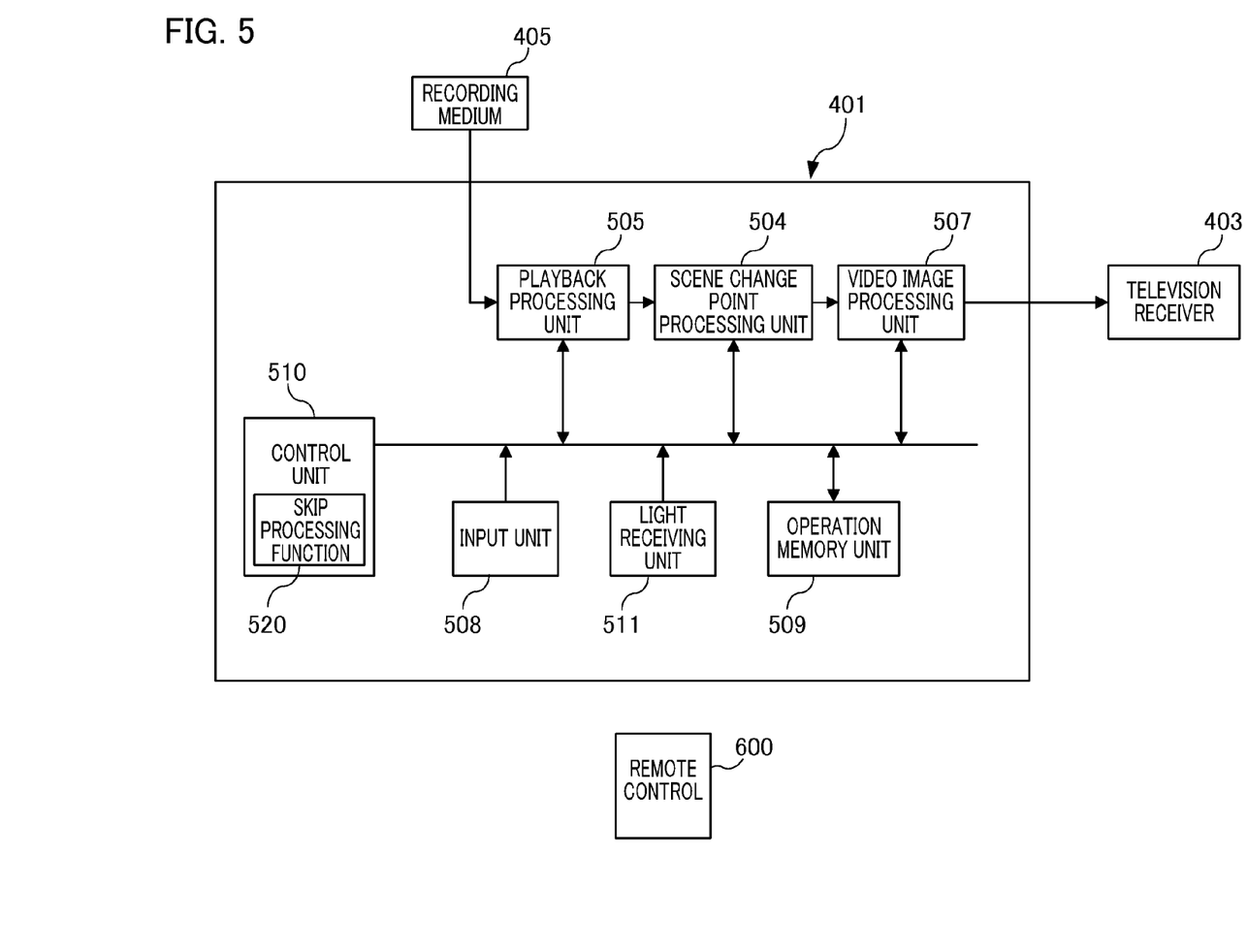
FIG. 5 is a block diagram that shows a second embodiment of the present invention.

FIG. 5 shows a second embodiment of the present invention. This embodiment is one in which the present invention is applied to a playback apparatus 401. In FIG. 5, the recording media 405 is, for example, a DVD (Digital Versatile Disc). The content data is recorded on a recording medium 405. The playback processing unit 505 decodes the playback signal from the recording medium 405, and outputs the content data.

The scene change point detecting unit 504 detects the position at which a scene in the content data that is being played back changes, and sends both the position information for the scene change point and the content data to the video processing unit 507. In one example of a method for detecting a scene change point, because the video image changes significantly before and after the location at which the scene changes, a scene change point can be detected by calculating the differences between video image data of the continuous screens and detecting locations at which the differences in the data for video images is large.

The video image processing unit 507 converts the content data to a video signal and an audio signal, and outputs these signals to a television receiver 403. The input unit 508 receives user operations from the buttons of the remote control 511 and the recording and playback apparatus body and sends these commands to the control unit 510. Examples of the user operations include fast forward, rewinding, skipping, and stopping during a replay operation. The operation storing unit 509 stores the operation information for the fast forward, rewind, and skip that have been carried out by the user. The operation information is information for the operation direction indicating whether the playback position of the content is advanced in the forward direction or returned in the reverse direction by an operation.

The control unit 510 carries out the control of each of the constituent elements by receiving commands from the input unit 508, and during playback, carries out control of the playback position for the fast forward, rewind, and skip and the like. In addition, when the control unit 510 receives a command for a skip operation or a fast forward and rewind operation, the information for the skip operation or the fast forward and rewind operations is stored in the operation memory unit 509. When a command for a skip operation is received next, it is determined whether the direction of the skip operation that is stored in the operation memory unit 509 or a fast forward or rewind operation is the direction identical to or opposite to the direction of the skip operation that is received next. When the direction is the opposite direction, the scene change point is detected from the playback signal by the scene change point detecting unit 504. If there is a scene change point in the skip segment of the skip operation received next, a skip processing function 520 is realized such that the playback position is moved to the scene change point.

The photoreceptor unit 511 receives an infrared signal from the remote control 600, thereby receiving user operations, and sends these commands to the control unit 510. Examples of the user operations include the setting of a time, and operations such as fast forward, rewind, skip, or stop during the playback operation.

Figure 6:
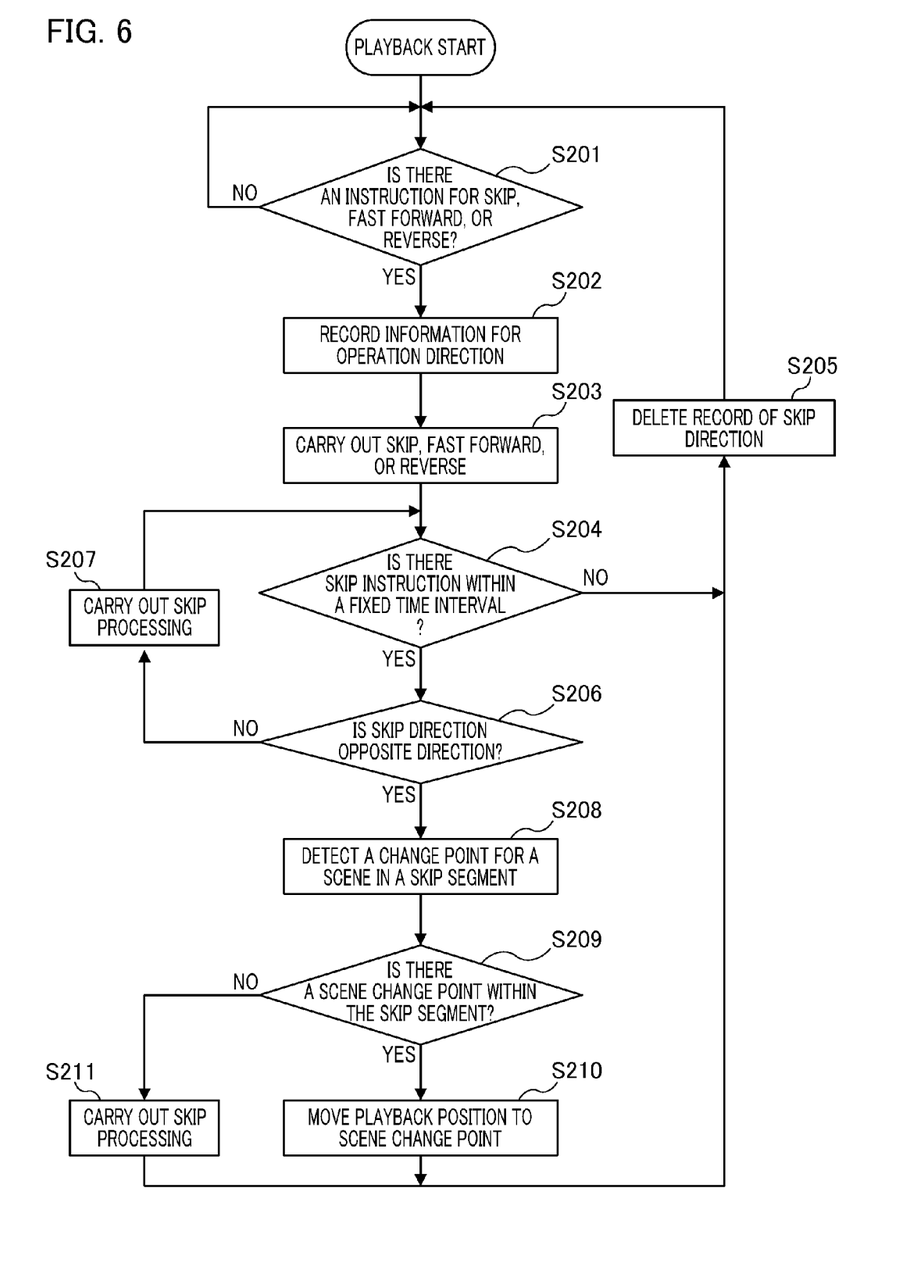
FIG. 6 is an explanatory drawing of the configuration of the external appearance of the remote control in the second embodiment of the present invention.

FIG. 6 is a flowchart of the control related to the skip processing function 520 that is carried out by the control unit 510. In FIG. 6, when the control unit 510 starts the playback of recorded content, the processing proceeds to step S201. In step S201, the control unit 510 determines whether or not a skip, fast forward, or rewind operation has been carried out. Then, in the case in which any of these operations have been carried out (Yes in Step S201), the control unit 510 advances the processing to step S202.

In step S202, the control unit 510 stores the operation direction of the operation carried out in step S201 in the operation memory unit 509. There are two operation directions: the "forward direction" and the "reverse direction". In addition, in step S203, the control unit 510 carries out the processing for a skip, fast forward, or rewind, and then advances the processing to step S204.

In step s204, the control unit 510 determines whether or not a skip operation has been carried out again within a fixed time interval after the operation of step S201 has been carried out. Note that in the case in which the operation carried out in step s201 was fast forward or rewind, this fixed time interval is the time that has elapsed since the playback operation was carried out after these operations. In the case in which the control unit 510 has determined that a skip operation has been carried out within the fixed time interval (Yes in step S204), it advances the processing to step s206.

In contrast, in the case in which a skip operation has not been carried out within the fixed time interval (No in step S204), the control unit 510 deletes the information for the operation direction that has been stored by the operation memory unit 509 in step s205, and then returns to step S205.

In step S206, the control unit 510 compares the operation direction for the skip operation or the fast forward and rewind operations in step S201 and the operation direction of the skip operation in step S204 carried out next. The control unit 510 also determines whether or not the direction of the skip operation is opposite to the operation direction up to that point in time. The information for the operation direction that has been stored by the operation memory unit 509 in the step S201 is used for the information for the operation direction. When the operation direction of the skip operation, the fast forward, or the rewind operation in step S201 is the same as the operation direction of the skip operation in step S204, the control unit 510 carries out a skip processing in step S207 and returns the processing to step S204.

In contrast, in the case in which the operation direction of a skip operation or a fast forward and rewind operations in step S201 is opposite to the operation direction of the skip operation in step S204, the processing proceeds to step S208. In step S208, the control unit 510 carries out the detection of a scene change point in a skip segment by using the scene change point detecting unit 102. Then, in step S209, the control unit 510 determines whether or not there is a scene change point within the skip segment that is specified in step S204.

In the case in which plural scene change points are present (Yes in step S209), the control unit S10 places the playback position from the current playback position to the scene change point that, among the scene change points within the skip segment in step S210, is closest to the current playback position. Note that among the scene change points within the skip segment, the playback position may be moved to the scene change point that is farthest from the current playback position. In contrast, in the case in which there are no scene change points present (No in step S209), the control unit 510 carries out the skip operation in step S211.

After carrying out the processing in step S210 and step S211, the control unit 510, deletes the information for the operation direction that has been stored in the operation memory unit 509 in step S205, returns to step S201, and then repeats this processing until the playback and completed.

The second embodiment is an example in which a playback apparatus 401 is used. The playback apparatus 401 reads the content data of a recording medium 405 such as a DVD or the like, and carries out the playback of the content. Thus, a scene change point cannot be detected in advance during the recording of content and recorded on the recording medium.

Thus, as shown in FIG. 5, a scene change point detecting unit 504 is provided downstream of the playback processing unit 505, and is configured to detect a scene change point based on the playback signal from the recording medium 405. In addition, as shown in the flowchart in FIG. 6, the detection of the scene change point in a skip section in step S208 is carried out only when the skip direction in step S204 is opposite to that of the operation of step S201. Placing the playback position to the scene change point by adding the processing in this step S208 becomes possible even in the playback apparatus.

Note that in the flowchart in FIG. 6, the detection of a scene change point is carried out only when the skip directions are opposite directions. However, this is not limiting, and control may be carried out such that scene change points may be detected each time the user carries out an operation such as a skip, fast forward, or rewind, or the playback position is moved to a detected scene change point in the case in which the skip directions are opposite directions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-000971 filed Jan. 6, 2009 which is hereby incorporated by reference herein in its entirety.

What is claimed is:

1. A playback apparatus comprising:
a playback unit that plays back data including scenes from a recording medium; and
a control unit that (a) determines whether or not, after a first operation causing a fast forward, rewind operation, or skip has been performed and before a predetermined time elapses, a second operation causing a skip is performed, and (b) determines whether or not an operational direction corresponding to the second operation is different from an operational direction corresponding to the first operation if the second operation is performed after the first operation has been performed and before the predetermined time elapses,
wherein the control unit moves a playback position to a first position if the second operation is performed after the first operation has been performed and before the predetermined time elapses, and the operational direction corresponding to the second operation is not different from the operational direction corresponding to the first operation, the first position being determined based on an end of a segment to be skipped, and
wherein the control unit moves the playback position to a second position if the second operation is performed after the first operation has been performed and before the predetermined time elapses, the operational direction corresponding to the second operation is different from the operational direction corresponding to the first operation, and a predetermined scene change point is included in the segment to be skipped, the second position being determined based on the predetermined scene change point.

2. The playback apparatus according to claim 1, wherein the control unit moves the playback position to the first position if the second operation is performed after the first operation has been performed and before the predetermined time elapses, the operational direction corresponding to the second operation is different from the operational direction corresponding to the first operation, and the predetermined scene change point is not included in the segment to be skipped.

3. The playback apparatus according to claim 1, wherein the predetermined scene change point is a scene change point which is included the segment to be skipped and is closest to the playback position.

4. The playback apparatus according to claim 1, wherein the predetermined scene change point is a scene change point which is included the segment to be skipped and is farthest from the playback position.

5. The playback apparatus according to claim 1, further comprising:
a storage unit that stores operational direction information which indicates the operational direction corresponding to the first operation.

6. The playback apparatus according to claim 5, wherein the operational direction information stored in the storage unit is deleted if the second operation is not performed within the predetermined time.

7. The playback apparatus according to claim 5, wherein the operational direction information stored in the storage unit is deleted if the playback position is moved to the first position.

8. The playback apparatus according to claim 5, wherein the operational direction information stored in the storage unit is deleted if the playback position is moved to the second position.

9. The playback apparatus according to claim 1, wherein the playback apparatus is configured to act as a hard disk recorder.

10. The playback apparatus according to claim 1, further comprising:
   a receiving unit that receives a broadcast wave which includes the data including scenes; and
   a recording unit that records the data included in the broadcast wave on the recording medium.

11. A method comprising:
   playing back data including scenes from a recording medium;
   determining whether or not, after a first operation causing a fast forward, rewind operation, or skip has been performed and before a predetermined time elapses, a second operation causing a skip is performed;
   determining whether or not an operational direction corresponding to the second operation is different from an operational direction corresponding to the first operation if the second operation is performed after the first operation has been performed and before the predetermined time elapses;
   moving a playback position to a first position if the second operation is performed after the first operation has been performed and before the predetermined time elapses, and the operational direction corresponding to the second operation is not different from the operational direction corresponding to the first operation, the first position being determined based on an end of a segment to be skipped; and
   moving the playback position to a second position if the second operation is performed after the first operation has been performed and before the predetermined time elapses, the operational direction corresponding to the second operation is different from the operational direction corresponding to the first operation, and a predetermined scene change point is included in the segment to be skipped, the second position being determined based on the predetermined scene change point.

12. The method according to claim 11, further comprising:
   moving the playback position to the first position if the second operation is performed after the first operation has been performed and before the predetermined time elapses, the operational direction corresponding to the second operation is different from the operational direction corresponding to the first operation, and the predetermined scene change point is not included in the segment to be skipped.

13. The method according to claim 11, wherein the predetermined scene change point is a scene change point which is included the segment to be skipped and is closest to the playback position.

14. The method according to claim 11, wherein the predetermined scene change point is a scene change point which is included the segment to be skipped and is farthest from the playback position.

15. The method according to claim 11, further comprising:
   storing operational direction information, which indicates the operational direction corresponding to the first operation, in a storage unit.

16. The method according to claim 15, further comprising:
   deleting the operational direction information stored in the storage unit if the second operation is not performed within the predetermined time.

17. The method according to claim 15, further comprising:
   deleting the operational direction information stored in the storage unit if the playback position is moved to the first position.

18. The method according to claim 15, further comprising:
   deleting the operational direction information stored in the storage unit if the playback position is moved to the second position.

19. The method according to claim 11, wherein the data including scenes is played back from the recording medium by a hard disk recorder.

20. The method according to claim 11, further comprising:
   receiving a broadcast wave which includes the data including scenes; and
   recording the data included in the broadcast wave on the recording medium.

* * * * *